(12) United States Patent
Gould et al.

(10) Patent No.: US 9,378,047 B1
(45) Date of Patent: Jun. 28, 2016

(54) EFFICIENT COMMUNICATION OF INTERRUPTS FROM KERNEL SPACE TO USER SPACE USING EVENT QUEUES

(71) Applicant: EMC Corporation, Hopkinton, MA (US)

(72) Inventors: Christopher M. Gould, Lunenburg, MA (US); Peter J. McCann, Mason, NH (US); Mikhail Y. Simonov, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 337 days.

(21) Appl. No.: 14/030,476

(22) Filed: Sep. 18, 2013

(51) Int. Cl.
*G06F 9/46* (2006.01)
*G06F 3/00* (2006.01)
*G06F 13/24* (2006.01)

(52) U.S. Cl.
CPC .................................. *G06F 9/46* (2013.01)

(58) Field of Classification Search
None
See application file for complete search history.

(56) References Cited

U.S. PATENT DOCUMENTS

| | | | |
|---|---|---|---|
| 6,832,266 B1 * | 12/2004 | Shaylor | G06F 9/485 719/312 |
| 7,249,211 B2 * | 7/2007 | Wieland | G06F 9/468 710/296 |
| 7,950,022 B1 * | 5/2011 | Gould | G06F 13/102 719/327 |
| 8,271,996 B1 | 9/2012 | Gould et al. | |

* cited by examiner

*Primary Examiner* — Wissam Rashid
(74) *Attorney, Agent, or Firm* — BainwoodHuang

(57) ABSTRACT

Techniques are provided for routinely enqueuing events onto event queues by direct operation of an interrupt service routine (ISR) in kernel space when possible. Only when the event queue is unavailable does the ISR resort to offloading the enqueuing process to another kernel space thread. Unavailability can further be made uncommon by using separate event cores for different processing cores.

9 Claims, 3 Drawing Sheets

Fig. 2

| | 49<br>Kernel Space Registration Table | |
|---|---|---|
| Interrupt ID | Core | Event Queue |
| D1_I1 | P1 | C1_P1 |
| D1_I2 | P2 | C2_P2 |
| D2_I1 | P2 | C1_P2 |
| Dm_I1 | P2 | C2_P2 |
| Dm_I2 | Pn | C2_Pn |
| Dm_I3 | Pn | C2_Pn |
| ⋮ | ⋮ | ⋮ |

EFFICIENT COMMUNICATION OF INTERRUPTS FROM KERNEL SPACE TO USER SPACE USING EVENT QUEUES

BACKGROUND

Hardware device drivers are often implemented within the kernel of an operating system of a computer in order to have easy access to hardware resources of the computer, particularly interrupts generated by particular hardware devices. Since it is sometimes desirable to implement hardware device drivers within user space rather than within the kernel (e.g., to protect against system crashes), some developers have implemented these hardware device drivers partially within the user space, relying on interrupt service routines (ISRs) within the kernel to notify the hardware device drivers of the appropriate interrupts.

While it can be difficult to communicate from kernel space to user space, some approaches allow communication from kernel space to user space by using an intermediate RAM-based file system (e.g., Procfs, Sysfs, Configfs, etc.). In such systems, the kernel space ISR writes to the RAM-based file system when an interrupt is processed, and the user space driver periodically polls the RAM-based file system for changes.

Other approaches use blocking system calls to communicate from kernel space to user space. In such systems, a user space driver sends a system call to the kernel. The user space driver then goes to sleep until it receives a response to the system call with information from the kernel ISR. The kernel only responds to the system call when a kernel ISR is ready to issue the next interrupt.

SUMMARY

Unfortunately, the above-described approaches for communicating between a kernel space ISR and a user space driver suffer from deficiencies. For example, in the approach of using a RAM-based file system to communicate between a kernel space ISR and a user space driver, the polling will typically either cause a high latency (when polling is done infrequently) or it will utilize excess system resources (when the polling is done frequently). The approach of using blocking system calls to communicate between a kernel space ISR and a user space driver also suffers from high latency and excess resource utilization.

In order to alleviate this problem, it would be desirable to implement techniques for communicating interrupts from a kernel space ISR to a user space driver with low latency and low resource utilization. It would be desirable to use event queues, described in U.S. Pat. No. 8,271,996, in order to efficiently queue events associated with a large volume of interrupts to one or more user space device drivers. However, because event queues utilize locks, it is not always possible for ISRs to enqueue events onto the event queue without waiting for the event queues to become unlocked. In principle this might be doable by having the ISR loop until the event queue is unlocked (although this is not technically permitted, and, in any case, it might fail if the event queue has been locked by a current thread which was executing at the time the interrupt occurred), but this is very inefficient from a resource utilization standpoint. While it would be much more efficient to go to sleep until the event queue becomes unlocked, ISRs are not permitted to go to sleep in most operating systems. Alternatively, the ISR could offload the entire enqueuing process to another kernel space thread, allowing the other kernel space thread to go to sleep pending the availability of the event queue. However, this introduces excess overhead in context switching (e.g., transferring interrupt information from the ISR context to the thread context and waking up that thread) every single time an interrupt is generated.

In contrast to the above-described approaches, improved techniques are described for routinely enqueuing events onto the event queues by direct operation of the ISR in kernel space when possible. Only when the event queue is unavailable does the ISR resort to offloading the enqueuing process to another kernel space thread. Unavailability can further be made uncommon by using separate event cores for different processing cores.

One embodiment of the improved techniques is directed to a method of handling interrupts from a set of devices, the method being performed by a computing device. The method includes (a) at each of a set of ISRs operating in a kernel of the computing device, routing a hardware device interrupt with an interrupt channel associated with that ISR to an event queue of a set of event queues by adding an event to a particular event queue of the set of event queues to which that ISR is registered, the event noting the interrupt channel of the hardware device interrupt and (b) operating a set of user helper threads in user space of the computing device, each user helper thread being registered to a particular event queue of the set of event queues, each user helper thread being configured to dequeue events from its respective event queue by consecutively dequeuing a top event of the event queue to be handled by a user space interrupt servicing handler (ISH) uniquely associated with both an interrupt channel of the top event and the event queue, the ISH operating in user space of the computing device. Furthermore, adding the event to the particular event queue of the set of event queues to which that ISR is registered is performed at least one time directly by the ISR operating in the kernel. In some embodiments, this method is achieved by selectively offloading adding the events to the queue to a kernel helper thread when the event queue is unavailable, but otherwise adding the event to the event queue directly within the ISR. Other embodiments are directed to a computerized apparatus and computer program products for performing methods similar to that described above.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 2 depicts an example registration table for use in performing various embodiments.

DETAILED DESCRIPTION

Embodiments are directed to improved techniques for routinely enqueuing events onto event queues by direct operation of an interrupt service routine (ISR) in kernel space when possible. Only when the event queue is unavailable does the ISR resort to offloading the enqueuing process to another kernel space thread. Unavailability can further be made uncommon by using separate event cores for different processing cores.

Figure 1:
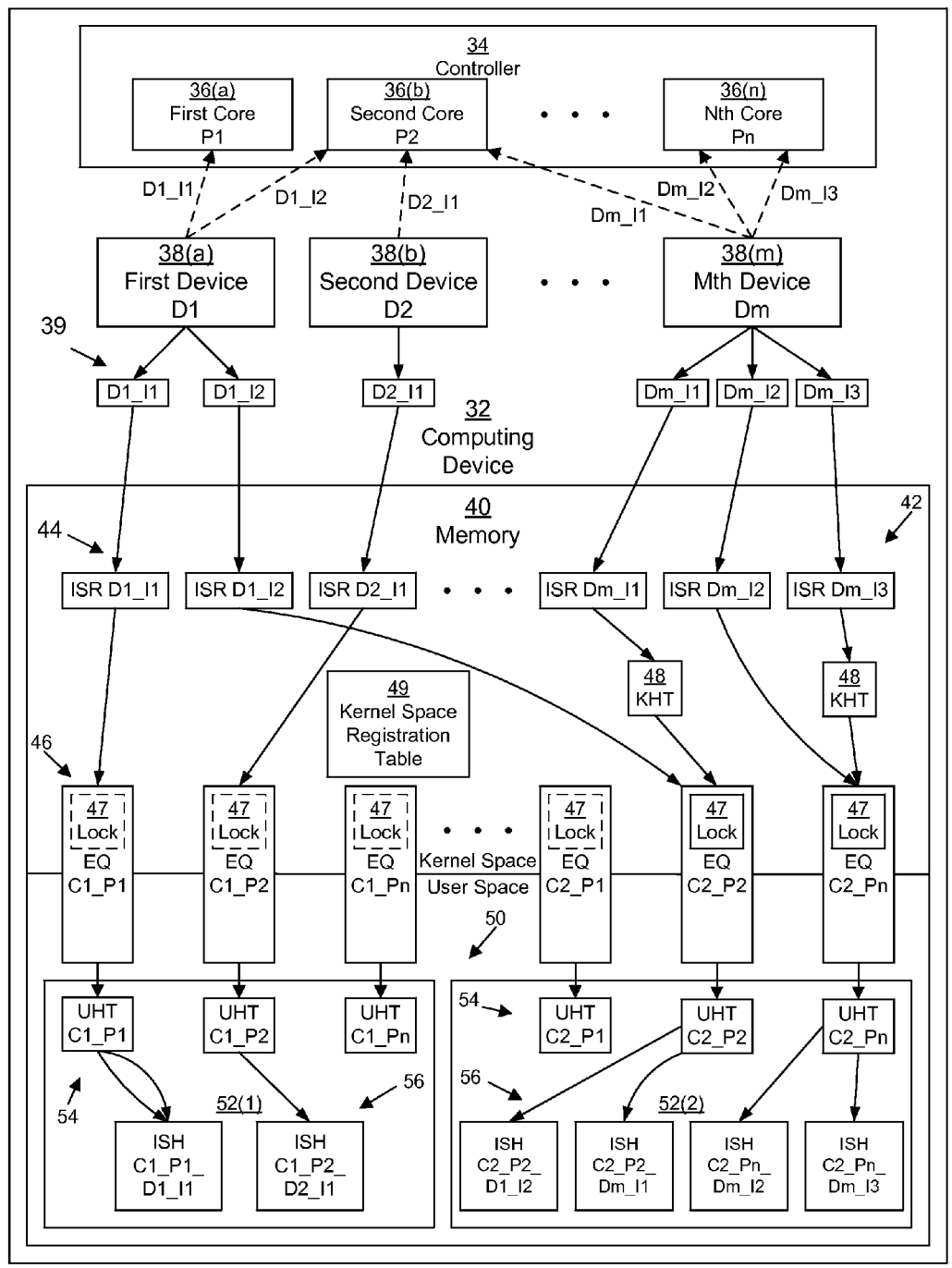
FIG. 1 depicts an example computing device for use in performing various embodiments.

FIG. 1 depicts an example computing device 32. In one embodiment, computing device 32 may be a storage processor of data storage system, such as, for example, a VNXe Series data storage system produced by the EMC Corp. of Hopkinton, Mass. In another embodiment, computing device 32 may be a storage host connected to a VNXe Series data storage system. In other embodiments, computing device 32 may be another kind of system other than a data storage system. In general, computing device 32 may be any kind of computing device, such as, for example, a personal computer, a workstation computer, a server computer, an enterprise server computer, a cellular phone, a smart phone, a tablet, a laptop computer, etc.

Computing device 32 includes a controller 34, a set of hardware devices 38, and memory 40. In some embodiments, computing device 32 may also include other features, such as, for example, a user interface and a network interface (not depicted).

Controller 34 may be any kind of processor or set of processors configured to perform operations, such as, for example, a microprocessor, a multi-core microprocessor, a digital signal processor, a system on a chip, a collection of electronic circuits, a similar kind of controller, or any combination of the above. As depicted, controller 34 includes multiple processing cores 36 (depicted as processing core P1 36(a), processing core P2 36(b), . . . , processing core Pn 36(n)). In one example embodiment, controller 32 includes sixteen processing cores 36.

Hardware devices 38 may be any kind of devices connected to the controller 34 by a system bus, such as, for example, a PCI Express bus. Examples of hardware devices 38 include storage controllers, network interface adapters, graphics controllers, etc. Each device 38 is configured to generate a set of device interrupts 39. In one embodiment, each device 38 is configured to be able to generate up to 2048 MSI-X interrupts as is known in the art, while in other embodiments, MSI or INTx interrupts are used.

Memory 40 may be any kind of digital system memory, such as, for example, random access memory (RAM). Memory 40 stores an operating system programs (e.g., Linux, UNIX, Windows, or similar operating systems) and applications executing on processor 38 as well as data used by those programs.

Memory 40 may include both a system memory portion for storing programs and data in active use by the processor 38 as well as a persistent storage portion (e.g., solid-state storage and/or disk-based storage) for storing programs and data (not depicted) even while the computing device 32 is powered off. The operating system (not depicted) and the applications are typically stored both in system memory and in persistent storage so that they may be loaded into system memory from persistent storage upon a system restart. Applications, when stored in non-transient form either in system memory or in persistent storage, form a computer program product. The processor 38 running one or more of these applications thus forms a specialized circuit constructed and arranged to carry out the various processes described herein.

Memory 40 includes (within system memory) a kernel space portion 42 and a user space portion 50. Kernel space 42 stores kernel programs, such as basic elements of the operating system, which are given full access to system resources, such as devices 38 and all of system memory. User space 50 includes one or more protected application memory spaces, each protected application memory space being associated with a particular application, allowing each application to run in its own protected portion of system memory.

Kernel space 42 includes a set of ISRs 44, each of which is responsible for servicing a particular interrupt 39 generated by the set of devices 38. In some embodiments, one or more of the interrupts is directed towards a particular processing core 36, as indicated by the dashed-line arrows in FIG. 1 (e.g., interrupt D1_I1 is directed towards first core 36(a) P1, interrupt D1_I2 is directed towards second core 36(b) P2, interrupt D2_I1 is directed towards second core 36(b) P2, interrupt Dm_I1 is directed towards second core 36(b) P2, and interrupts Dm_I2 and Dm_I3 are directed towards Nth core 36(n) Pn). In such embodiments, the ISRs 44 are configured to operate on the same core to which their assigned interrupt is directed. At least some of the ISRs 44 are configured to communicate their respective interrupts 39 to interrupt servicing threads 56 operating in user space 50 using event queues 46. Event queues 46 are data structures within memory 40 which are accessible both to the kernel space 42 and the user space 50. Event queues 46 may be implemented, for example, as ring buffers. The general structure and function of event queues 46 are similar to the event queues described in U.S. Pat. No. 8,271,996 issued on Sep. 18, 2012, the entire contents and teachings of which are hereby incorporated herein by this reference.

A lock 47 may be included the event queues 46. In some cases (depicted by a dashed line box for lock 47), when the event queue 46 is in a locked state (i.e., the lock 47 is held by another thread), instead of an ISR 44 directly adding the event to the event queue 46, the ISR 44 employs a kernel helper thread (KHT) 48 in order to add the event to the event queue 46. It should be understood that each event queue may have more than one lock 47, to allow for several kinds of locks.

Kernel space 42 may also include a kernel space registration table 49, which will be described below in further detail in connection with FIG. 2.

User space 50 includes a set of container applications 52. As depicted, there are two container applications 52(1), 52(2), although this is by way of example only. Container applications 52 may be applications which deal directly with hardware devices 38. For example, container application 52(1) may be a block-based data storage management application, while container application 52(2) may be a file-based data storage management application. Both container applications 52(1), 52(1) may need to perform certain tasks in response to interrupts 39 issued by devices 38, especially storage controllers and network interface adapters in the example.

Each container application 52 includes a set of user helper threads (UHTs) 54 (operating in user space) as well as a set of user space interrupt servicing handlers (ISHs) 56. Each event queue 46 is uniquely associated with a particular UHT 54, which is configured to process events off its associated event queue 46 and send an interrupt generated based on each event to the appropriate ISH 56 to be handled. It should be understood that the code within the ISHs 56 is very similar to code that might be found in a traditional kernel space 42 ISR. Thus, if the developer wishes to handle interrupts directly in the kernel 42 instead of in user space, the ISH 56 can be run within the kernel 42 without significant alteration. Conversely, given a system that is already configured to fully handle interrupts 39 within a legacy ISR in the kernel 42, it would be possible to utilize the code of the legacy ISR as the ISH 56 by operating it within user space 50 in conjunction with the techniques described herein.

As depicted, there are separate event queues 46 for each processing core 36, and there are also separate event queues 46 for each container application 52. Thus, since there are three processing cores 36 and two container applications 52 depicted, there are six event queues 46 depicted. This arrangement is advantageous, because it allows all interrupts 39 of the same type to be handled by each container application 52 on a single processing core 36, which allows for certain processing efficiencies, such as a reduced need to copy or transfer cache resources between processing cores 36. It also provides multiple paths between the kernel space 42 and the user space 50, which becomes advantageous as the interrupt 39 throughput of the computing system 32 increases, thereby eliminating contention for access to each event queue 46 (at least in embodiments in which each event queue 46 handles interrupts directed at only a single core 36).

FIG. 1 will be described in further detail in connection with FIGS. 2 and 3.

FIG. 2 depicts an example kernel space registration table 49. Kernel space registration table 49 is a database that associates particular interrupt 39 channels with particular processing cores 36 and event queues 46 to be used to send the interrupts 39 to the appropriate ISHs 56.

Thus, for example, first device D1 38(a) is depicted in FIG. 1 as being able to generate two interrupts 39: D1_I1 and D1_I2; second device D2 38(b) is depicted in FIG. 1 as being able to generate one interrupt 39: D2_I1; and Mth device Dm 38(m) is depicted in FIG. 1 as being able to generate three interrupts 39: Dm_I1, Dm_I2, and Dm_I3. Each of these interrupts 39 (D1_I1, D1_I2, D2_I1, Dm_I1, Dm_I2, and Dm_I3) is listed in registration table 49 with a corresponding processing core 36 and a corresponding event queue 46.

As depicted by the dashed-line arrows in FIG. 1, interrupt 39 D1_I1 is meant to be handled by first core P1 36(a). Kernel space registration table 49 encodes this association by assigning D1_I1 to core P1 and to event queue 46 C1_P1, which means that interrupt 39 D1_I1 is to be sent to an event queue 46 associated with the first core P1 36(a). The event queue 46 assignment also means that interrupt 39 D1_I1 is to be sent to an event queue 46 associated with the first container 52(1).

Similarly, interrupt 39 D1_I2 is depicted in FIG. 1 as being handled by second core P2 36(b). However, in the case of interrupt 39 D1_I2, second core P2 36(b) handles interrupt 39 D1_I2 with respect to the second container 52(2). Thus, kernel space registration table 49 assigns interrupt 39 D1_I2 to event queue 46 C2_P2 to allow handling by the second container 52(2) on the second core P2 36(b). Interrupts 39 D2_I1, Dm_I1, Dm_I2, and Dm_I3 are assigned respective event queues 46 C1_P2, C2_P2, C2_Pn, and C2_Pn similarly by the kernel space registration table 49.

Figure 3:
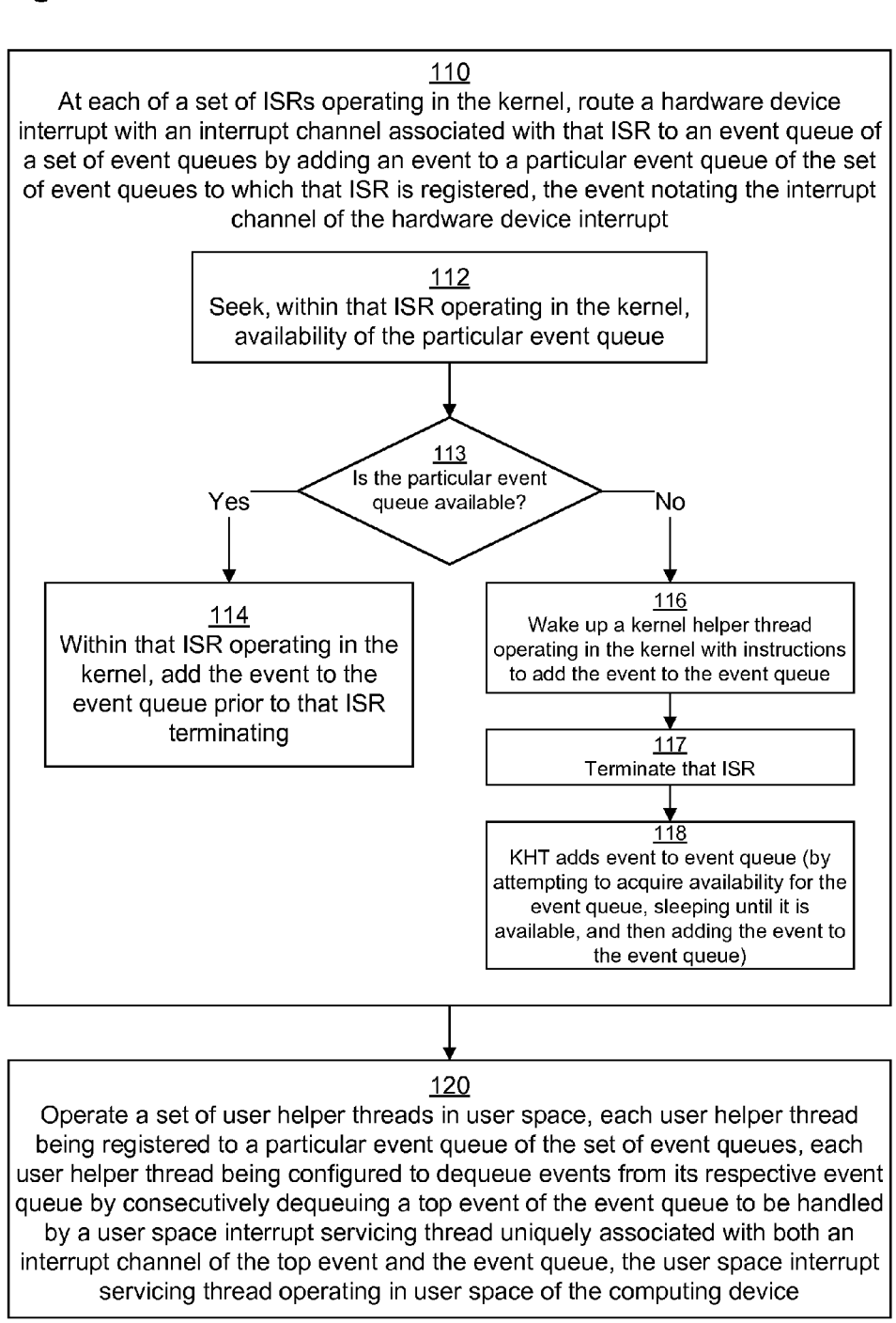
FIG. 3 depicts an example method according to various embodiments.

FIG. 3 depicts an example method 100 performed by computing device 32 for routinely enqueuing events onto event queues 46 by direct operation of an ISR 44 in kernel space 42 when possible.

It should be understood that any time a piece of software, such as, for example, ISRs 44, user helper threads 54, ISHs 56, kernel helper threads 48, or container applications 52, is described as performing a method, process, step, or function, in actuality what is meant is that a computing device (e.g., computing device 32) on which that piece of software is running performs the method, process, step, or function when executing that piece of software on its processor (e.g., controller 34, and, in some cases, a particular processing core 36).

In step 110, various ISRs 44 operating in kernel space 42 of computing device 32 each route an interrupt 39 (having a particular channel associated with that ISR 42) from a device 38 to an event queue 46 by adding an event to a particular event queue 46 to which that ISR 44 is registered (e.g., with reference to kernel space registration table 49). The event added to the event queue 46 includes a notation of the interrupt channel. This is because several different interrupt channels (e.g., Dm_I2 and Dm_I3) may both utilize the same event queue 46 even though they will ultimately be handled by different ISHs 56 (e.g., C2_Pn_Dm_I2 and C2_Pn_Dm_I3, respectively). In some embodiments, events added to the event queue 46 also include data stored within a particular system register (not depicted). In some of these embodiments, the identity of the particular register for each respective interrupt channel is stored within the kernel space registration table 49.

At least one of the interrupts 39 is routed directly by the ISR 44 operating in kernel space 42. In one embodiment, step 110 is accomplished by sub-steps 112-118. In sub-step 112, the ISR 44 operating in the kernel space 42 of the computing device 32 seeks availability of the particular event queue 46 (in order to be able to add an event to it). In sub-step 113, ISR 44 determines whether the event queue 46 is available. This is not very common, but there are several reasons why an event queue may not be available. For example, if the event queue 46 has been locked by another thread (e.g., an even queue cleanup thread), it will be unavailable. In embodiments in which event queues 46 are assigned interrupts from different processing cores it is also possible (although unlikely) that another ISR 44 may have locked the event queue 46. As another example, if the event queue 46 is full, it will also be deemed unavailable.

When sub-step 113 has a positive result (indicating that the event queue 46 is available), operation proceeds to sub-step 114. In sub-step 114, the ISR 44 operating in the kernel space 42 of the computing device 32 adds the event to the event queue 46 and then the ISR 44 terminates. In some embodiments, the ISR 44 adds the event by first obtaining the lock 47 for the event queue, while the ISR 44 possesses the lock 47 adding the event to the end of the event queue 46, and upon adding the event releasing the lock 47.

When sub-step 113 has a negative result (indicating that the event queue 46 is unavailable), operation proceeds to sub-step 116. In sub-step 116, the ISR 44 wakes up a kernel helper thread 48 with instructions to add an event to the event queue 46, in sub-step 117, the ISR 44 immediately terminates upon waking up the kernel helper thread 48, and in sub-step 118, the kernel helper thread 48 adds the event to the event queue 46. Kernel helper thread 48 performs sub-step 118 by, for example, seeking availability of the event queue 46, sleeping until the event queue 46 becomes available (e.g., not locked by another thread and not full), and then adding the event to the event queue 46 (as in sub-step 114).

In step 120, each container application 52 operates a set of user helper threads 54 in user space 50. Each user helper thread 52 is registered to a particular event queue 46. In addition, each user helper thread 52 is configured to dequeue events from its respective event queue 46 by consecutively dequeuing a top event from that event queue 46 and recreating the interrupt 39 that originally yielded that event and sending the recreated interrupt to an appropriate ISH 56 determined by the identity of the event queue 46 as well as the event details. For example, the identity of the event queue 46 may determine that the ISH 56 must operate on a particular processing core 36 and within a particular container application 52, while the interrupt channel from the event may further determine which ISH 56.

For example, say first device D1 38(a) generates an interrupt 39 with interrupt channel D1_I1. In step 110, the ISR 44 for D1_I1 routes (with reference to kernel space registration table 49) that interrupt to event queue 46 C1_P1 by adding an event reflecting details of the interrupt 39 to the event queue 46 C1_P1. In more detail, ISR 44 for D1_I1 does this by seeking, in sub-step 112, the availability of the event queue 46 C1_P1. Assuming that, at this point, the event queue 46 available (e.g., event queue 46 C1_P1 is unlocked and not full), sub-step 113 will yield a positive result, allowing execution to proceed with sub-step 114. In sub-step 114, ISR 44 for D1_I1 obtains the lock 47 for event queue 46 C1_P1, places an event identifying interrupt channel D1_I1 (and any register data associated therewith—see U.S. Pat. No. 8,271,996 for details) at the end of the event queue 46 C1_P1, and then releases the lock 47 for event queue 46 C1_P1, at which point the ISR 44 for D1_I1 may terminate. In step 120, once the event reaches the top of the event queue 46 C1_P1, UHT 54 C1_P1 dequeues the event off the top of the event queue 46 C1_P1, reconstructs the original interrupt 39 having interrupt channel D1_I1 (and any register data), and sends it to the ISH 56 C1_P1_D1_I1 because that is the ISH 56 for interrupts having interrupt channel D1_I1 coming off UHT 54 C1_P1. ISH 56 C1_P1_D1_I1 is then able to handle the interrupt just as if it were an ISR operating directly in the kernel space 42.

As another example, say first device D1 38(a) generates an interrupt 39 with interrupt channel D1_I2. In step 110, the ISR 44 for D1_I2 routes (with reference to kernel space registration table 49) that interrupt to event queue 46 C2_P2 by adding an event reflecting details of the interrupt 39 to the event queue 46 C2_P2. In more detail, ISR 44 for D1_I2 does this by seeking, in sub-step 112, the availability of the event queue 46 C2_P2. Assuming that, at this point, the event queue 46 is available (e.g., event queue 46 C2_P2 is unlocked and not full), sub-step 113 will yield a positive result, allowing execution to proceed with sub-step 114. In sub-step 114, ISR 44 for D1_I2 obtains the lock 47 for event queue 46 C2_P2, places an event identifying interrupt channel D1_I2 (and any register data associated therewith) at the end of the event queue 46 C2_P2, and then releases the lock 47 for event queue 46 C2_P2, at which point the ISR 44 for D1_I2 may terminate. In step 120, once the event reaches the top of the event queue 46 C2_P2, UHT 54 C2_P2 dequeues the event off the top of the event queue 46 C2_P2, reconstructs the original interrupt 39 having interrupt channel D1_I2 (and any register data), and sends it to the ISH 56 C2_P2_D1_I2 because that is the ISH 56 for interrupts having interrupt channel D1_I2 coming off UHT 54 C2_P2. ISH 56 C2_P2_D1_I2 is then able to handle the interrupt just as if it were an ISR operating directly in the kernel space 42.

As a continuation of the previous example, say Mth device Dm 38(m) generates an interrupt 39 with interrupt channel Dm_I1 just after first device D1 38(a) generates the interrupt 39 with interrupt channel D1_I2. In step 110, the ISR 44 for Dm_I1 routes (with reference to kernel space registration table 49) that interrupt to event queue 46 C2_P2 by adding an event reflecting details of the interrupt 39 to the event queue 46 C2_P2. In more detail, ISR 44 for Dm_I1 does this by seeking, in sub-step 112, the availability of the event queue 46 C2_P2. Assuming that, at this point, the lock 47 is unavailable because the event queue 46 is now full (e.g., the last remaining spot in event queue 46 C2_P2 has just been filled by the ISR 44 for D1_I2), sub-step 113 will yield a negative result, causing execution to proceed with sub-step 116. In sub-step 116, ISR 44 for Dm_I1 wakes up a kernel helper thread 48 and instructs it to enqueue an event for an interrupt 39 with interrupt channel Dm_I1 onto event queue 46 C2_P2. Immediately thereafter, the ISR 44 for Dm_I1 terminates, in sub-step 117. Then, in sub-step 118, the KHT 48 adds the event to the event queue 46 C2_P2. This is done by the KHT 48 seeking the availability of the event queue 46 C2_P2, sleeping until it is available, and then, once the event queue 46 available, obtaining the lock 47 for event queue 46 C2_P2, placing an event identifying interrupt channel Dm_I1 (and any register data associated therewith) at the end of the event queue 46 C2_P2, and then releasing the lock 47 for event queue 46 C2_P2. In step 120, once the event reaches the top of the event queue 46 C2_P2, UHT 54 C2_P2 dequeues the event off the top of the event queue 46 C2_P2, reconstructs the original interrupt 39 having interrupt channel Dm_I1 (and any register data), and sends it to the ISH 56 C2_P2_Dm_I1 because that is the ISH 56 for interrupts having interrupt channel Dm_I1 coming off UHT 54 C2_P2. ISH 56 C2_P2_Dm_I1 is then able to handle the interrupt just as if it were an ISR operating directly in the kernel space 42.

Thus, techniques have been described for routinely enqueuing events onto event queues 46 by direct operation of an ISR 44 in kernel space 42 when possible. Only when the event queue 46 is unavailable thread does the ISR 44 resort to offloading the enqueuing process to another kernel space thread 48.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described in the context of a multi-core system with multiple container applications 52, the mapping of interrupts 39 to event queues 46 being done on the basis of processor core 36 and container application 52, this is by way of example only. In other embodiments, the mapping of interrupts 39 to event queues 46 may instead be done on one or more other bases, such as by processor (each processor having multiple cores 36) or solely on the basis of container application 52.

In addition, although various embodiments have been described as being methods, software embodying these methods is also included. Thus, one embodiment includes a tangible non-transitory computer-readable storage medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. §102 or 35 U.S.C. §103, such determination being a legal determination that depends upon many factors, not all of which are known to Applicants at this time.

What is claimed is:

1. A method of handling interrupts from a set of devices, the method being performed by a computing device, the method including:
   at each of a set of interrupt servicing routines (ISRs) operating in a kernel of the computing device, routing a hardware device interrupt with an interrupt channel associated with that ISR to an event queue of a set of event queues by adding an event to a particular event queue of the set of event queues to which that ISR is registered, the event notating the interrupt channel of the hardware device interrupt; and operating a set of user helper threads in user space of the computing device, each user helper thread being registered to a particular event queue of the set of event queues, each user helper thread being configured to dequeue events from its respective event queue by consecutively dequeuing a top event of the event queue to be handled by a user space interrupt servicing handler (ISH) uniquely associated with both an interrupt channel of the top event and the event queue, the user space ISH operating in user space of the computing device;

wherein adding the event to the particular event queue of the set of event queues to which that ISR is registered is performed at least one time directly by the ISR operating in the kernel; and wherein each event queue is uniquely associated with both a processing core of the computing device and a container application running on the computing device, each user space ISH respectively operating on the processing core associated with that user space ISH's associated event queue in support of the container application associated with that user space ISH's associated event queue.

2. A method of handling interrupts from a set of devices, the method being performed by a computing device, the method including:

at each of a set of interrupt servicing routines (ISRs) operating in a kernel of the computing device, routing a hardware device interrupt with an interrupt channel associated with that ISR to an event queue of a set of event queues by adding an event to a particular event queue of the set of event queues to which that ISR is registered, the event notating the interrupt channel of the hardware device interrupt; and operating a set of user helper threads in user space of the computing device, each user helper thread being registered to a particular event queue of the set of event queues, each user helper thread being configured to dequeue events from its respective event queue by consecutively dequeuing a top event of the event queue to be handled by a user space interrupt servicing handler (ISH) uniquely associated with both an interrupt channel of the top event and the event queue, the user space ISH operating in user space of the computing device;

wherein adding the event to the particular event queue of the set of event queues to which that ISR is registered is performed at least one time directly by the ISR operating in the kernel; and wherein adding the event to the particular event queue of the set of event queues to which that ISR is registered includes:

seeking, within that ISR operating in the kernel, an availability of the particular event queue;

if the particular event queue is available, then, within that ISR operating in the kernel, adding the event to the particular event queue prior to that ISR terminating; and otherwise:

waking up a kernel helper thread operating in the kernel with instructions to add the event to the particular event queue;

terminating that ISR; and adding the event to the particular event queue by the kernel helper thread.

3. The method of claim 2 wherein adding the event to the particular event queue by the kernel helper thread includes:

seeking the availability of the particular event queue by the kernel helper thread;

the kernel helper thread sleeping until the particular event queue is available; and once the particular event queue is available, adding the event to the particular event queue by the kernel helper thread.

4. An apparatus comprising:

memory, the memory including a kernel space and a user space;

a set of hardware devices configured to issue hardware device interrupts; and a controller, the controller being configure to perform the operations of:

at each of a set of interrupt servicing routines (ISRs) operating in the kernel space, routing a hardware device interrupt with an interrupt channel associated with that ISR to an event queue of a set of event queues by adding an event to a particular event queue of the set of event queues to which that ISR is registered, the event notating the interrupt channel of the hardware device interrupt; and operating a set of user helper threads in user space, each user helper thread being registered to a particular event queue of the set of event queues, each user helper thread being configured to dequeue events from its respective event queue by consecutively dequeuing a top event of the event queue to be handled by a user space interrupt servicing handler (ISH) uniquely associated with both an interrupt channel of the top event and the event queue, the user space ISH operating in user space;

wherein the operation of adding the event to the particular event queue of the set of event queues to which that ISR is registered is performed at least one time directly by the ISR operating in the kernel space; and wherein each event queue is uniquely associated with both a processing core of the controller and a container application running on the apparatus, each user space ISH respectively operating on the processing core associated with that user space ISH's associated event queue in support of the container application associated with that user space ISH's associated event queue.

5. An apparatus comprising:

memory, the memory including a kernel space and a user space;

a set of hardware devices configured to issue hardware device interrupts; and a controller, the controller being configure to perform the operations of:

at each of a set of interrupt servicing routines (ISRs) operating in the kernel space, routing a hardware device interrupt with an interrupt channel associated with that ISR to an event queue of a set of event queues by adding an event to a particular event queue of the set of event queues to which that ISR is registered, the event notating the interrupt channel of the hardware device interrupt; and operating a set of user helper threads in user space, each user helper thread being registered to a particular event queue of the set of event queues, each user helper thread being configured to dequeue events from its respective event queue by consecutively dequeuing a top event of the event queue to be handled by a user space interrupt servicing handler (ISH)

uniquely associated with both an interrupt channel of the top event and the event queue, the user space ISH operating in user space;

wherein the operation of adding the event to the particular event queue of the set of event queues to which that ISR is registered is performed at least one time directly by the ISR operating in the kernel space; and wherein the operation of adding the event to the particular event queue of the set of event queues to which that ISR is registered includes:

seeking, within that ISR operating in the kernel space, an availability of the particular event queue;

if the particular event queue is available, then, within that ISR operating in the kernel space, adding the event to the particular event queue prior to that ISR terminating; and otherwise:

waking up a kernel helper thread operating in the kernel space with instructions to add the event to the particular event queue;

terminating that ISR; and adding the event to the particular event queue by the kernel helper thread.

6. The apparatus of claim 5 wherein the operation of adding the event to the particular event queue by the kernel helper thread includes:

seeking the availability of the particular event queue by the kernel helper thread;

the kernel helper thread sleeping until the particular event queue is available; and once the particular event queue is available, adding the event to the particular event queue by the kernel helper thread.

7. A computer program product comprising a non-transitory computer-readable storage medium storing a set of instructions, which, when executed by a computing device, cause the computing device to perform the operations of:

at each of a set of interrupt servicing routines (ISRs) operating in a kernel space of the computing device, routing a hardware device interrupt with an interrupt channel associated with that ISR to an event queue of a set of event queues by adding an event to a particular event queue of the set of event queues to which that ISR is registered, the event notating the interrupt channel of the hardware device interrupt; and operating a set of user helper threads in user space of the computing device, each user helper thread being registered to a particular event queue of the set of event queues, each user helper thread being configured to dequeue events from its respective event queue by consecutively dequeuing a top event of the event queue to be handled by a user space interrupt servicing handler (ISH) uniquely associated with both an interrupt channel of the top event and the event queue, the user space ISH operating in user space;

wherein the operation of adding the event to the particular event queue of the set of event queues to which that ISR is registered is performed at least one time directly by the ISR operating in the kernel space; and wherein each event queue is uniquely associated with both a processing core of the computing device and a container application running on the computing device, each user space ISH respectively operating on the processing core associated with that user space ISH's associated event queue in support of the container application associated with that user space ISH's associated event queue.

8. The computer program product of claim 7 wherein the operation of adding the event to the particular event queue of the set of event queues to which that ISR is registered includes:

seeking, within that ISR operating in the kernel space, an availability of the particular event queue;

if the particular event queue is available, then, within that ISR operating in the kernel space, adding the event to the particular event queue prior to that ISR terminating; and otherwise:

waking up a kernel helper thread operating in the kernel space with instructions to add the event to the particular event queue;

terminating that ISR; and adding the event to the particular event queue by the kernel helper thread.

9. The computer program product of claim 8 wherein the operation of adding the event to the particular event queue by the kernel helper thread includes:

seeking the availability of the particular event queue by the kernel helper thread;

the kernel helper thread sleeping until the particular event queue is available; and once the particular event queue is available, adding the event to the particular event queue by the kernel helper thread.

* * * * *